(12) United States Patent
Taylor

(10) Patent No.: US 6,558,231 B1
(45) Date of Patent: May 6, 2003

(54) SEQUENTIAL ELECTROMACHINING AND ELECTROPOLISHING OF METALS AND THE LIKE USING MODULATED ELECTRIC FIELDS

(75) Inventor: E. Jennings Taylor, Troy, OH (US)

(73) Assignee: Faraday Technology Marketing Goup, LLC, Troy, OH (US)

( * ) Notice: Subject to any disclaimer, the term of this patent is extended or adjusted under 35 U.S.C. 154(b) by 0 days.

(21) Appl. No.: 09/688,378

(22) Filed: Oct. 17, 2000

(51) Int. Cl.⁷ .............................. B24B 1/00; B23H 9/02
(52) U.S. Cl. ........................... 451/36; 205/659; 451/57
(58) Field of Search ............................ 451/28, 36, 57; 205/659, 658, 646; 204/DIG. 9

(56) References Cited

U.S. PATENT DOCUMENTS

| | | | | |
|---|---|---|---|---|
| 3,585,341 A | * | 6/1971 | O'Connor | 219/69.16 |
| 3,624,336 A | * | 11/1971 | Martinez | 204/212 |
| 4,202,739 A | * | 5/1980 | Csakvary et al. | 204/224 M |
| 5,049,246 A | * | 9/1991 | Hull et al. | 204/224 M |
| 5,256,262 A | * | 10/1993 | Blomsterberg | 204/224 M |
| 5,378,330 A | * | 1/1995 | Li et al. | 205/661 |
| 5,507,923 A | * | 4/1996 | Stouse et al. | 204/224 M |
| 6,139,715 A | * | 10/2000 | Wei | 204/224 M |

\* cited by examiner

*Primary Examiner*—Timothy V. Eley
(74) *Attorney, Agent, or Firm*—Thompson Hine LLP

(57) ABSTRACT

A surface of an electrolytically dissolvable material, e.g., an electrolytically dissolvable metal, is smoothed by a two-step electrochemical process wherein a the surface to be smoothed and a counterelectrode are contacted with an electrolyte and an electric current is passed between the substrate and counterelectrode, with the substrate as the anode. In a first step relatively large asperities on the substrate are reduced in height by maintaining a macroprofile regime by using a pulsed electric current with short pulses. In a second step, small asperities and the remainder of the large asperities are reduced or removed by maintaining a microprofile regime by using a pulsed current having longer pulses or a direct current.

17 Claims, 3 Drawing Sheets

SEQUENTIAL ELECTROMACHINING AND ELECTROPOLISHING OF METALS AND THE LIKE USING MODULATED ELECTRIC FIELDS

BACKGROUND OF THE INVENTION

1. Field of the Invention

This invention relates to electromachining and electropolishing of metals and the like and more particularly to sequential electromachining and electropolishing by changing the conditions of the electrolytic process.

2. Brief Description of the Prior Art

It is often desirable or necessary to provide for the manufacture of metal articles with a smooth polished surface. Conventional manufacturing operations, however, e.g., cutting, turning, forging, casting, drilling, and the like, often leave an object with finished shape and dimensions, but a surface that is marred by machine marks or tool lines, burrs, flashings, and the like. Consequently, the manufactured article must be subjected to a final finishing step of removing burrs and similar relatively large defects and a final polishing step that provides a very smooth, even mirrorlike, surface. Removal of burrs and relatively large imperfections has often been performed by hand, with resultant large expenditure of time and effort. Small parts have been polished by tumbling with abrasive powders. Chemical-mechanical polishing has also been used. Flat surfaces, in particular, have also been finished by electropolishing, wherein a smooth electrode is positioned very close to the surface and an electric current is passed between the electrode, as cathode, and substrate surface, as anode, in order to remove small roughnesses on the substrate.

More recently, it has been discovered that electrochemical deburring can be conducted using charge-modulated electrochemical dissolution. Such a process is disclosed in copending U.S. patent application Ser. No. 09/080,264, now U.S. Pat. No. 6,402,931 the entire disclosure of which is incorporated herein by reference. However, it as been found that charge modulated conditions that are appropriate for deburring are not always suitable for electropolishing.

Accordingly, a need has continued to exist for a method of conducting electrochemical smoothing of machined surfaces that can provide a finished polished surface.

SUMMARY OF THE INVENTION

The problem of providing a finished polished surface by an electrochemical procedure applied to the surface of a manufactured article has now been alleviated by the method of this invention. According to the invention a surface of an electrolytically dissolvable material, e.g., an electrolytically dissolvable metal, can be smoothed by a two-step electrochemical process wherein a surface to be smoothed and a counterelectrode are contacted with an electrolyte and an electric current is passed between the substrate and counterelectrode, wherein the substrate is predominantly anodic with respect the counterelectrode. In a first step the electrolytic environment at the substrate surface is maintained as a macroprofile until the relatively large roughness has been eliminated, and, in a second step, the electrolytic environment at the substrate surface is maintained as a microprofile to complete the electropolishing of the surface.

Accordingly, it is an object of the invention to provide a method for smoothing the surface of a manufactured article.

A further object is to provide a method for electrochemically deburring and polishing a metal surface.

A further object is to provide a method for deburring and polishing a metal surface using charge-modulated electrodissolution.

A further object is to provide a method for electrolytically smoothing a metal surface by using charge-modulated electrochemical dissolution wherein relatively large asperities are removed using a first pulsed current waveform and small asperities are removed using a second pulsed current waveform.

A further object is to provide a method for smoothing a metal surface using charge-modulated electrochemical dissolution wherein relatively large asperities are removed by maintaining the electrochemical environment at the surface in a macroprofile regime and the small asperities are removed by maintaining the electrochemical environment at the surface in a microprofile regime.

Further objects of the invention will be apparent from the description of the invention that follows.

DETAILED DESCRIPTION OF THE INVENTION AND PREFERRED EMBODIMENTS

Preparation of a smooth, polished surface of a manufactured article requires removing roughness produced by the manufacturing process. Shaping procedures used in manufacturing, such as cutting, turning, milling, forging, drilling, casting, and the like, operate on the surface of the manufacturing blank to produce the final proper shape, e.g., a turned shaft, a drilled hydraulic manifold, or the like. However, the mechanical shaping operations often leave the surface of the shaped article in a rough condition that is unsuitable for interacting with other mechanical parts or is cosmetically unacceptable for a commercial product. Accordingly, final smoothing and/or final polishing the surface of a manufactured article is a step that is required for a large proportion of such articles.

Electropolishing of metal surfaces has been known for some time. Furthermore, electrolytic deburring using pulsed and/or pulse reverse electrolysis is disclosed in copending U.S. patent application Ser. No. 09/080,264, the entire disclosure of which is incorporated herein by reference. However, the phenomena occurring at the surface of the substrate have not been entirely understood, with the result that practitioners have not been able to select the conditions suitable for producing an optimally smooth surface.

Figure 1:
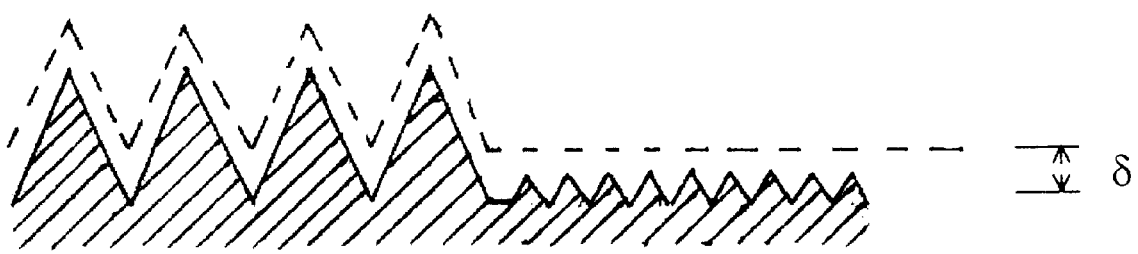
FIG. 1 is a schematic illustration of a surface of a substrate having relatively large asperities and relatively small asperities in relation to the thickness of the Nernst diffusion layer.

A machined surface of a substrate such as a metal typically has a certain roughness produced by the action of the shaping and forming tools used to produce the article. The surface will, in general, have asperities which may be of varying sizes as shown schematically in FIG. 1. Electrodissolution of the metal surface will produce an excess concentration of metal ions at the surface which have to be carried away by the electrolyte bath. However, the viscosity of the bath assures that a thin layer immediately adjacent to the substrate surface does not partake in the general agitation of the bath. Consequently, the dissolved ions must travel through this layer by diffusion before they reach the bulk bath and are carried away. This layer through which the ions must pass from the surface of the substrate to the bulk bath is the Nernst diffusion layer. The thickness of the Nernst diffusion layer is a function of the kinematic viscosity and agitation of the bath as well as of the limiting electrolytic current. A similar problem of transfer of metal ions through the Nernst diffusion layer occurs in electrodeposition of metals on a substrate. The effects produced by the presence of the Nernst diffusion layer are generally discussed in the electroplating context, but similar considerations apply when material is removed from a surface by electrodissolution.

The thickness of the Nernst diffusion layer in a conventional electrochemical bath with moderate stirring is in the range of about 50 micrometers to about 100 micrometers ($\mu$m). However, in the cases of electromachining with small interelectrode gaps and/or higher linear flow velocities of the electrolyte much thinner Nernst diffusion layers are to be expected. The surface of a manufactured article may exhibit asperities ranging in relief from several millimeters to less than one micrometer. A finished and polished surface will typically exhibit no asperities greater than that defined in the product specification and measured either visually or by various surface profilometry means. The roughness of a polished surface is frequently expressed in terms of an Ra value as determined by a conventional profilometer. The Ra value is defined as the arithmetic mean of the absolute value of the distance from the mean line to the profile. A smooth polished surface suitable for a high-quality commercial product might have an Ra value defined by the end use, in the order of for example 5 $\mu$m or less.

It is conventional to describe a surface wherein the height of the asperities is of the order of the thickness of the Nernst diffusion layer as a macrorough surface. Accordingly, such asperities may be defined as macroasperities. Similarly, a surface wherein the height of the asperities is significantly less than the thickness of the Nernst diffusion layer is described as a microrough surface, and such asperities may be defined as microasperities.

Accordingly, the thickness of the Nernst diffusion layer will typically be of the order of or significantly less than the height of the larger asperities on a machined surface, for example prior to any final finishing, and may be substantially thicker than the height of the smaller asperities, for example after final finishing. The relationship of the thickness of the Nernst diffusion layer, $\delta$, to the height of the surface asperities is illustrated schematically in FIG. 1. However, if the electric current is applied in pulses (PC) instead of direct current (DC) the diffusion layer through which the ions must travel under the pulsed current conditions may be considered to be effectively shorter. The effect of pulsed current, also described as modulated current or modulated charge transfer, is described in detail in U.S. Pat. No. 5,599,437, to E. J. Taylor et al., the entire disclosure of which is incorporated herein by reference. The detailed disclosure in U.S. Pat. No. 5,599,437 is given in terms of an electroplating process, wherein metal is deposited from the electrolyte solution onto the surface of a substrate. However, the same principles apply to an electrodissolution process, wherein an electrolytically dissolvable material, e.g., a metal, is removed from the surface of a substrate. In general, if the charge is transferred in short pulses, i.e., if the current is applied in short pulses, the Nernst diffusion layer will be thinner than it is under DC electrolysis conditions, because the full thickness of the layer does not have time to develop before the pulse terminates. Consequently, the use of short pulses of current can so thin the effective Nernst diffusion layer that a microprofile condition can become converted into a macroprofile condition. Alternatively, a macroprofile condition can be converted into a smaller macroprofile condition, thereby removing the degree of concentration polarization or secondary current distribution. As a general rule the shorter the pulse used, the more the current distribution is determined by the electrode geometry (primary current distribution controlled by ohmic effects) and variation in overpotential due to electrode profile (secondary current distribution controlled by kinetic effects). In fact, depending on the size of the asperity, the role of electrochemical cell geometry may by minimal. In either case, when polarization is removed, i.e., from concentration to secondary and or primary, the current distribution becomes more non-uniform. Accordingly, metal will removed preferentially at the peaks of the macroasperities, e.g., burrs and the like, whereby the surface is smoothed on a macroscopic level. For portions of the surface having only microasperities or when the macroasperities become microasperities, the distribution of the electrolytic activity is influenced by the rate of mass transfer through the diffusion layer, which causes the effect of the electric current to be more uniform (tertiary current distribution). Consequently, smoothing of a surface with microasperities requires a long pulse modulation wavetrain, or even a DC field is sufficient in cases where there is no need for a reversing pulse as taught by Inoue in U.S. Pat. No. 3,654,116.

Figure 4A:
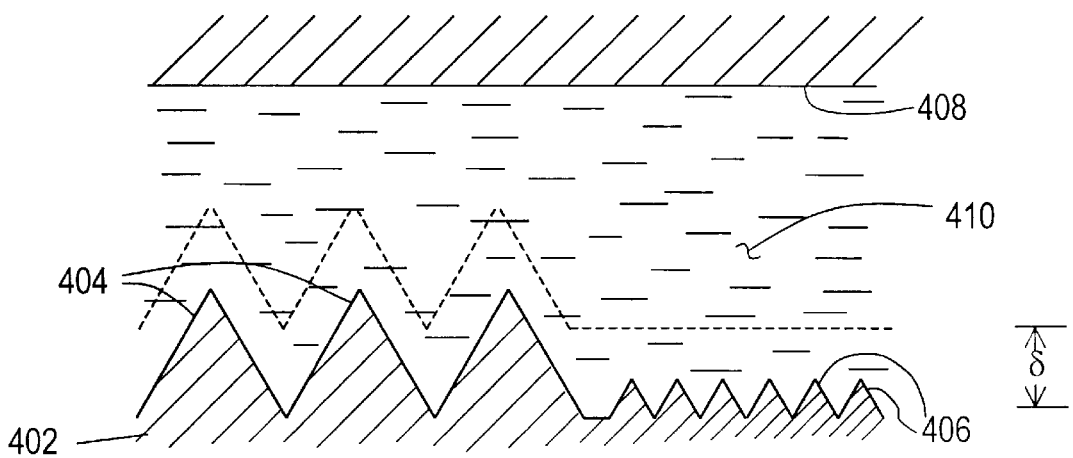
FIG. 4A illustrates an arrangement for smoothing a surface having both macroasperities and microasperities by the process of the invention at the beginning of the process.

According to the method of the invention an electrolyte is interposed between and in contact with an electrically conductive substrate surface to be smoothed electrolytically and a counterelectrode. Such an arrangement is illustrated in FIG. 4A, wherein a substrate 402 having large asperities 404 and small asperities 406, and a counterelectrode 408 are contacted by an electrolyte 410. An electric current is then passed between the counterelectrode and the substrate by a conventional power supply not shown, with the substrate being maintained anodic with respect to the counterelectrode.

According to the invention, in a first step, relatively large asperities such as burrs and machine tool marks having a height greater than the thickness of the Nernst diffusion layer under conventional conditions of electrolytic bath agitation, i.e., a height of about 100 $\mu$m or greater, are removed by establishing macroprofile conditions at the substrate surface and conducting an electrodissolution step until the asperities have been reduced to a height less than the thickness of the Nernst diffusion layer under those conditions. Alternatively, in many electromachining applications where solution is rapidly forced through a thin gap between the workpiece and the counterelectrode, high linear flow velocities may be established. Under these conditions, the Nernst diffusion layer may be considerably smaller and considerably smaller asperities may still represent macroasperities relative to the Nernst diffusion layer. This is accomplished by reducing the thickness of the Nernst diffusion layer to its thinnest practical value. As is well known, this can be accomplished by increasing the agitation of the electrolytic bath, especially by assuring a rapid transverse flow of electrolyte across the substrate surface. Such a procedure is useful especially when the surface to be electropolished is the interior of a closed conduit, or the like, wherein the flow of electrolyte can be simply increased by pumping the electrolyte through the conduit at a greater rate. However, as explained in U.S. Pat. No. 5,599,437, the thickness of the Nernst diffusion layer can be decreased by applying the electric current in a stream of pulses as taught by N. Ibl et al. in *Surface Technology*, Vol. 6, p. 287 (1978); and *Surface Technology*, Vol. 10, p. 81 (1980); and K. Yin, *Surface and Coatings Technology*, Vol. 88, p. 162 (1996), the entire disclosures of which are incorporated herein by reference. As shown therein, the thickness of the Nernst diffusion layer is less for shorter pulses. Consequently, a macroprofile condition, i.e., Nernst diffusion layer thinner than the heights of the relatively large asperities, can be established by using pulsed current (i.e., pulsed charge transfer), with or without concomitant enhanced agitation of the electrolytic bath. The thickness of the Nernst diffusion layer 5 with respect to the height of the macroasperities 404 and microasperities 406 is illustrated in FIG. 4A.

Under the macroprofile conditions so established, the larger asperities are reduced in height. The microasperities, which have a height less than the thickness of the Nernst diffusion layer, under the conditions of pulsed current electrolysis would tend to become macroasperities. Hence, these microasperities are not subject to the preferential removal of metal from the tips of the asperities. Hence they are eroded more or less uniformly, with no special increase in smoothing rate. The first step of the process is continued until the macroasperities have been reduced in height to where they become microasperities, in most cases less than about 100 µm. Accordingly, in the first step of the process, the macroasperities are converted into microasperities.

Figure 2:
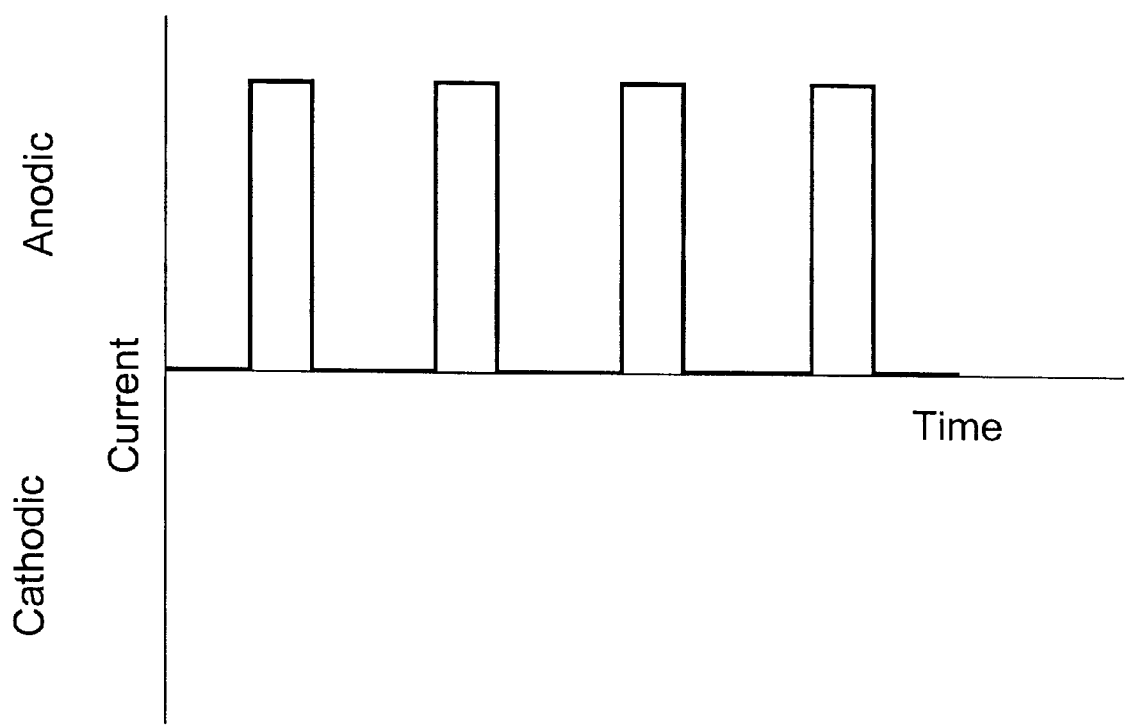
FIG. 2 illustrates the waveform of a preferred charge modulated electric current used for removing the macroasperities of an electrolytically dissolvable surface.

As indicated above, it is usually more convenient to establish macroprofile conditions (a macroprofile regime) at the substrate surface by employing pulsed current using relatively short pulses. Typically the pulse width may range from about 0.1 microsecond to about 100 milliseconds, although shorter or longer pulses are not excluded, provided that macroprofile conditions are maintained the substrate surface. It is preferred that the pulses be no longer than about 10 milliseconds, more preferably no longer than about 1 millisecond, and most preferably no longer than about 100 microseconds. The off-times and or reverse times between the pulses may range from about 10 microseconds to about 500 milliseconds. The duty cycle of the pulse train, i.e., the ratio of on-time to off-time, may range from about 0.001 to about 0.5. Expressed in percentage, the duty cycle is preferably no greater than about 50%. More preferably it is no greater than about 25% or even 10%. An exemplary waveform used in the first step of the process of the invention is illustrated in FIG. 2. The pulses are indicated therein as anodic pulses. Because the anodic pulses are those active in removal of metal, they are denoted the forward pulses for purposes of this application. Typically the shorter pulses are associated with a shorter duty cycle and a thinner Nernst diffusion layer. Such conditions allow the macroasperities to be maximally reduced in the first step of the process. However, the skilled practitioner will recognize that low duty cycles mean a low average current, i.e., low rate of transfer of charge, with consequent slow removal of metal and slower electropolishing action. Accordingly, the practitioner will adapt the above teaching to the needs of a particular application, considering the rate of polishing and the efficiency of the process. In practice, compromises may have to be made between rate of polishing and ultimate smoothness achieved. Furthermore, while it cannot be absolutely determined when the surface transition from macroasperity to microasperity takes place, such a situation will be evident from experiment which demonstrates that the surface smoothing process stops and the microasperities, such as tool lines, are simply not further removed. Consequently, it is not excluded that some experimentation may be necessary in a given case to achieve the right combination of pulse rate, pulse width, duty cycle and agitation for optimum results in a commercial setting.

Figure 4B:
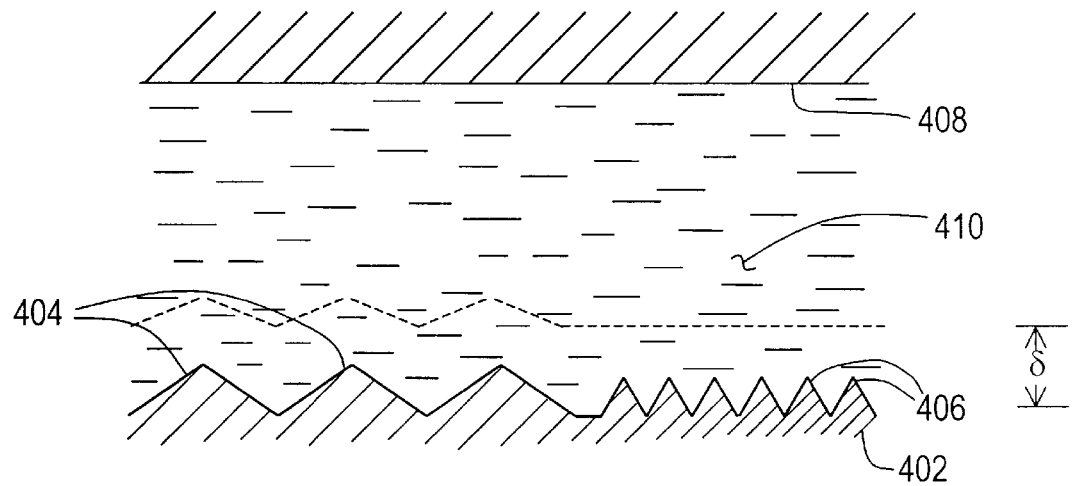
FIG. 4B illustrates the arrangement of FIG. 4A after the first step of the process has been completed and the macroasperities have been reduced in size to microasperities.

The substrate profile at the end of the first step of the process is illustrated in FIG. 4B, wherein the macroasperities 404 have been substantially reduced to a height comparable with that of the microasperities 406.

Once the macroasperities have been reduced in height to the point that they no longer substantially exceed the thickness of the Nernst diffusion layer, the electropolishing is continued in a second step wherein the conditions are adjusted to produce a microprofile regime at the substrate surface. That is, the thickness of the Nernst diffusion layer is adjusted to be greater than the height of the remaining asperities. Under such a microprofile regime with current sufficiently large enough, the electrolytic action is determined by mass transport by diffusion, i.e., so-called tertiary control. This inverse relationship between the current and the transition time which defines when tertiary control plays an important role is well known to those skilled in the art, and is discussed, for example by Sand, among others. Under these conditions metal is preferentially removed from the tips of the microasperities. Consequently the electropolishing continues in the second step until the microasperities have been reduced to any desired degree. The final roughness of the surface, i.e., Ra value, can be reduced to any practical value, e.g., 0.1 µm or less.

Figure 3:
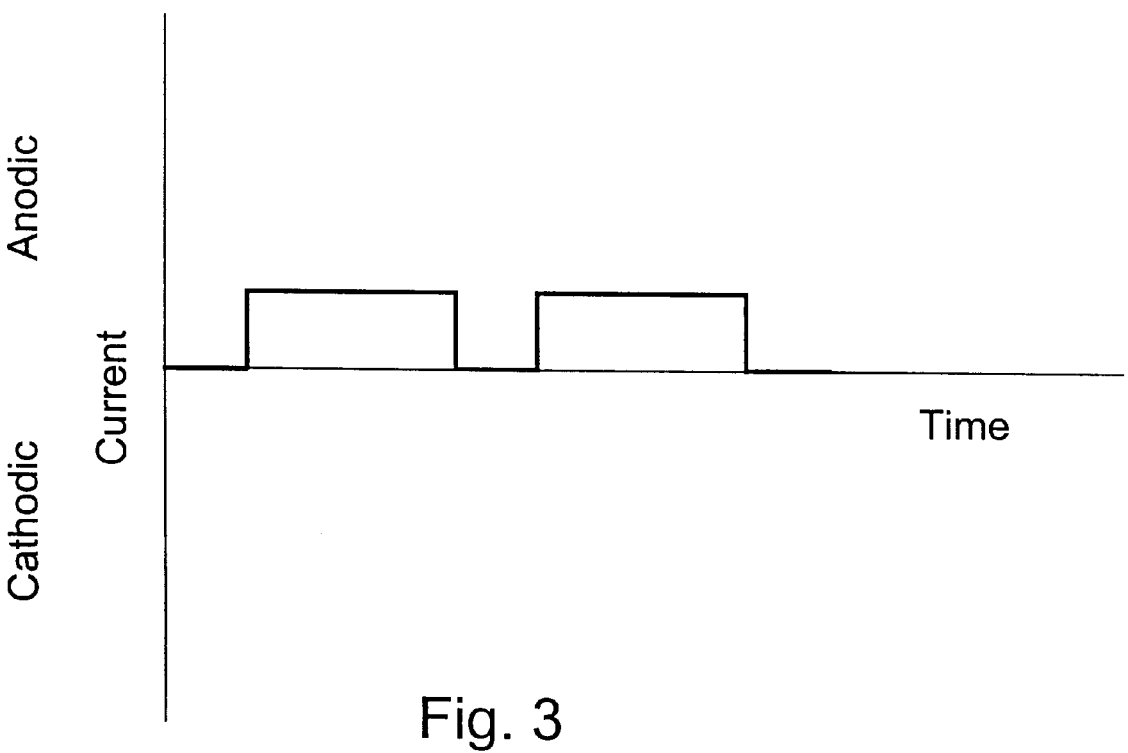
FIG. 3 illustrates the waveform of a preferred charge modulated electric current used for removing the microasperities of an electrolytically dissolvable surface.

In order to establish the microprofile regime for the second step of the process of the invention, the degree of agitation of the bath can be reduced, or the length of the pulses in the pulsed current can be lengthened and the off-time between the pulses reduced in order to produce a relatively thick Nernst diffusion layer. In fact, if there is no practical need for a reversing pulse, the process may be solely DC. The anodic or forward pulses in the second step of the process should be longer than those in the first step and in general will have a pulse duration or pulse width of at least 100 milliseconds, preferably at least 500 milliseconds. The current in the second step of the process may also be DC. The off-times and or reverse times will also in general be shorter than in the first step of the process. The duty cycle is preferably greater than about 50%. More preferably it is greater than about 75% or even 90%. An exemplary waveform used in the second step of the process of the invention is illustrated in FIG. 3. The electropolishing in the second step of the process may continue until the surface is as smooth as desired for the particular application. Typically, the second step is continued until the surface attains an Ra value of about 0.2 µm or less, although, in principle any degree of smoothness, even to the level of atomic dimensions may be attained by continued electropolishing.

Figure 4C:
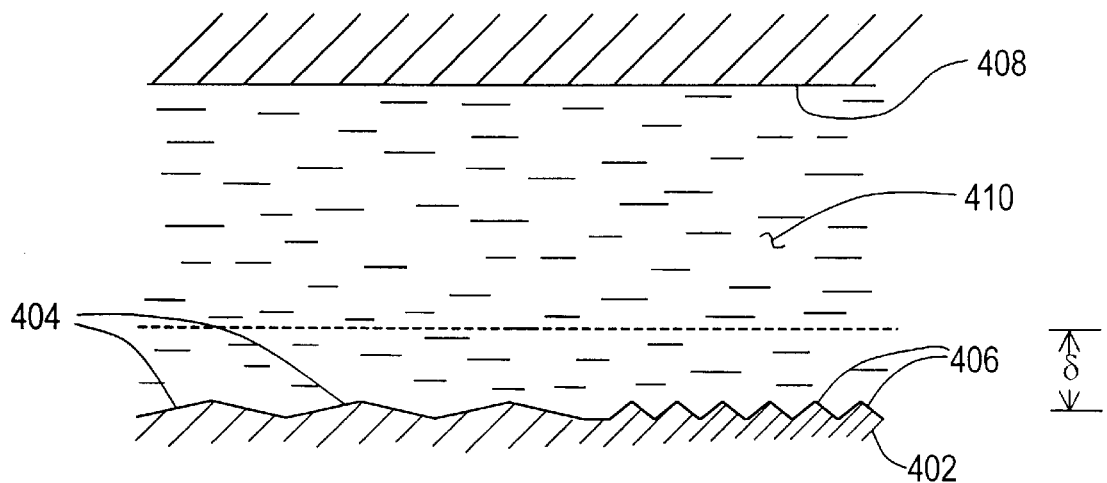
FIG. 4C illustrates the arrangement of FIGS. 4A and 4B after the second step of the smoothing process has been completed and the microasperities have been substantially reduced or eliminated.

The profile of the substrate after some period of electropolishing in the second step of the process is illustrated in FIG. 4C wherein both the original macroasperities 404 and the microasperities 406 have been substantially reduced in height.

The invention having now been fully described, it should be understood that it may be embodied in other specific forms or variations without departing from its spirit or essential characteristics. Accordingly, the embodiments described above are to be considered in all respects as illustrative and not restrictive, the scope of the invention being indicated by the appended claims rather than the foregoing description, and all changes which come within the meaning and range of equivalency of the claims are intended to be embraced therein.

I claim:

1. A method for smoothing the surface of an electrodissolvable substrate comprising
    providing an electrodissolvable substrate having a surface with macroasperities, said macroasperities having a height greater than about 100 micrometers;
    providing a counterelectrode;
    interposing an electrolyte between and in contact with said substrate and said counterelectrode; and
    passing an electric current between said substrate and said counterelectrode, whereby a Nernst diffusion layer is established at said substrate surface;
wherein
    in a first step,
        said diffusion layer is maintained at a thickness to produce a macroprofile regime for at least the largest of said macroasperities until said macroasperities have been reduced to a height less than about 100 micrometers thereby being converted into microasperities; and
    in a second step,
        said diffusion layer is maintained at a thickness to produce a microprofile regime to reduce the height of said microasperities.

2. The method of claim 1 wherein said electric current in said first step is a first pulsed current comprising a first train of first pulses separated by a first off-time, said first pulses having a first pulse width no greater than about 100 milliseconds.

3. The method of claim 2 wherein said first pulse width is not greater than about 10 milliseconds.

4. The method of claim 2 wherein said first pulse width is not greater than about 1 millisecond.

5. The method of claim 2 wherein said first pulse train has a first duty cycle not greater than about 50%.

6. The method of claim 2 wherein said first pulse train has a first duty cycle not greater than about 25%.

7. The method of claim 2 wherein said first pulse train has a first duty cycle not greater than about 10%.

8. The method of claim 2 wherein reverse pulses may replace at least some or all of said first off-time between said forward pulses.

9. The method of claim 8 wherein said reverse pulses immediately precede said forward pulses without intervening off-time.

10. The method of claim 1 wherein, in said second step, said electric current is a second pulsed current comprising a second train of second forward pulses, said second forward pulses having a second pulse width greater than said first pulse width.

11. The method of claim 10 wherein said second pulses have a pulse width not less than about 10 milliseconds.

12. The method of claim 10 wherein said second pulses have pulse width not less than about 500 milliseconds.

13. The method of claim 10 wherein said second pulse train has a second duty cycle greater than said first duty cycle and not less than about 50%.

14. The method of claim 10 wherein said second pulse train has a second duty cycle not greater than about 75%.

15. The method of claim 10 wherein said second pulse train has a second duty cycle not less than about 90%.

16. The method of claim 1 wherein in said second step said electric current is direct current.

17. A method for smoothing the surface of an electrodissolvable substrate comprising,
    in a first step,
        providing an electrodissolvable substrate having a surface with macroasperities, said macroasperities having a height greater than about 100 micrometers;
        providing a counterelectrode;
        interposing an electrolyte between and in contact with said substrate and said counterelectrode; and
        converting said macroasperities into microasperities by passing an electric current between said substrate and said counterelectrode, while maintaining said substrate anodic with respect to said counter-electrode, whereby a Nernst diffusion layer is established at said substrate surface; and
        maintaining said diffusion layer at a thickness to produce a macroprofile regime for at least the largest of said macroasperities for a period of time until said macroasperities have been reduced to a height less than about 100 micrometers, thereby being converted into microasperities; and
    in a second step,
        reducing said microasperities by
            continuing said passing an electric current while maintaining said diffusion layer at a thickness to produce a microprofile regime.

* * * * *

UNITED STATES PATENT AND TRADEMARK OFFICE
CERTIFICATE OF CORRECTION

PATENT NO. : 6,558,231 B1 Page 1 of 1
DATED : May 6, 2003
INVENTOR(S) : E. Jennings Taylor It is certified that error appears in the above-identified patent and that said Letters Patent is hereby corrected as shown below:

<u>Title page,</u>
Item [73], Assignee, change the word "Goup" to -- Group --.

Signed and Sealed this

Twentieth Day of January, 2004

JON W. DUDAS
*Acting Director of the United States Patent and Trademark Office*